United States Patent
Tye

(10) Patent No.: US 12,091,494 B2
(45) Date of Patent: Sep. 17, 2024

(54) FLEXIBLE COATING COMPOSITION

(71) Applicant: SWIMC LLC, Cleveland, OH (US)

(72) Inventor: Anthony J. Tye, Warrensville Heights, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 17/745,635

(22) Filed: May 16, 2022

(65) Prior Publication Data

US 2022/0275147 A1    Sep. 1, 2022

Related U.S. Application Data

(62) Division of application No. 16/601,785, filed on Oct. 15, 2019, now abandoned.

(51) Int. Cl.
| | |
|---|---|
| C08G 59/22 | (2006.01) |
| C08G 63/06 | (2006.01) |
| C08G 63/08 | (2006.01) |
| C09D 163/00 | (2006.01) |
| C09D 187/00 | (2006.01) |

(52) U.S. Cl.
CPC .............. C08G 59/22 (2013.01); C08G 63/06 (2013.01); C08G 63/08 (2013.01); C09D 163/00 (2013.01); C09D 187/005 (2013.01)

(58) Field of Classification Search
None
See application file for complete search history.

(56) References Cited

U.S. PATENT DOCUMENTS

| | | |
|---|---|---|
| 3,408,421 A | 10/1968 | Kurka |
| 5,070,119 A | 12/1991 | Nugent, Jr. et al. |
| 5,332,785 A | 7/1994 | Brindoepke |
| 5,426,148 A | 6/1995 | Tucker |
| 2009/0143501 A1 | 6/2009 | Green et al. |
| 2012/0164462 A1 | 6/2012 | Schmitt et al. |
| 2014/0303283 A1 | 10/2014 | Ding et al. |
| 2021/0292507 A1* | 9/2021 | Coquet ................ C08G 81/025 |

OTHER PUBLICATIONS

International Search Report and Written Opinion mailed Jun. 16, 2020.
International Preliminary Report on Patentability mailed Apr. 19, 2022.

* cited by examiner

*Primary Examiner* — Megan McCulley
(74) *Attorney, Agent, or Firm* — HONIGMAN LLP

(57) ABSTRACT

The present disclosure describes polymers and improved resin systems having flexibility, low water uptake, good adhesion, chemical resistance, and/or weatherability at extreme negative temperatures, such as temperatures down to about −40° C. or below and even temperatures down to about −60° C. The systems herein, in approaches, include a polymer or resin system for an epoxy component of an epoxy/amine system including an epoxy and/or acetoacetoxy functionalized flexible block copolymer that has a base hydrophobic polyol block or core, optional flexible monomeric blocks, and epoxy, acetoacetoxy, or both functional endcaps.

10 Claims, No Drawings

FLEXIBLE COATING COMPOSITION

CROSS-REFERENCE TO RELATED APPLICATIONS

This application is a divisional application of U.S. application Ser. No. 16/601,785, filed Oct. 15, 2019, which is incorporated in its entirety herein by reference.

FIELD

The present application relates to a resin system with improved flexibility at low temperatures; and in particular, a resin suitable for the epoxy component of a two-component epoxy/amine system providing flexibility at extreme cold operating conditions.

BACKGROUND

Polymeric coatings often need to withstand extreme environmental conditions and maintain a uniform and crack-free surface. Often, a cause of cracking of polymeric coatings may be due to dramatic temperature shifts from very hot to very cold within a short period of time and/or prolonged exposure to extreme temperatures, such as those below −40° C. to temperatures even below −60° C. Temperature shifts and extreme exposures can lead to stresses within a polymeric coating composition that easily can lead to surface cracking and other deformities.

However, polymeric coatings for extreme environments not only have to pass flexibility requirements, but also commonly need to pass other typical coating requirements such as adhesion, weatherability, chemical resistance, and low moisture uptake to suggest a few properties of such coatings. Available coatings that purport to pass flexibility requirements; however, often cannot meet the flexibility at extreme temperatures and also achieve good coating application with desired surface uniformity, adhesion, and/or low moisture uptake at the same time.

Known flexible polymeric coating systems for extreme conditions are often based on high molecular mass thermoplastic resins including acrylates, methacrylates and/or vinyls and, in view of the high molecular weight, typically require a high solvent or water fraction for application to the corresponding surface. Unfortunately, this leads to long drying times, and in some cases when thick coatings are applied, very long dry times. For reasons of environmental protection, water-based coatings are being used increasingly, but may require even longer drying times, especially in regions with high atmospheric humidity.

SUMMARY

In one approach or embodiment, a flexible block copolymer is described herein. These polymers may be useful in an epoxy component of a two-part, epoxy-amine system. In some aspects, the flexible block copolymer includes a hydrophobic polyol block; functional endcaps provided by epoxy groups, acetoacetate groups, or both, the endcaps having a functionality greater than 1; and optional isocyanate-functional extension groups. In other aspects of the polymer, when the hydrophobic polyol block includes epoxy or fatty acid derived polyol groups, then the flexible copolymer further includes one or more cyclic ester-derived blocks between the hydrophobic polyol block and the functional endcaps, wherein each cyclic ester-derived block includes the residue of at least 3 or more repeating cyclic ester groups.

The flexible block copolymer as described in the previous paragraph may have additional embodiments when combined with one or more optional features in any combination. These optional features may include one or more of the following: wherein the hydrophobic polyol block includes a C20 to a C60 dimer or trimer fatty acid diol and wherein the one or more cyclic ester-derived blocks includes the residue of at least 3 or more repeating lactone groups; and/or where the hydrophobic polyol block includes a polyalkyleneglycol diol having a number average molecular weight of about 500 to about 2000 g/mol; and/or wherein the polyalkylene glycol diol is a polyethylene glycol diol or a polypropylene glycol diol; and/or wherein the hydrophobic polyol block is derived from a diester of a digycidyl ether; and/or wherein the hydrophobic polyol block is derived from glycidyl ethers of (cyclo)aliphatic or aromatic hydroxy compounds or derived from glycidyl ethers based on polyhydric alcohols or phenols; and/or wherein the hydrophobic polyol block is derived from a diester of a digycidyl ester; and/or wherein the hydrophobic polyol block is derived from polyglycidyl esters of polycarboxylic acids; and/or further comprising the isocyanate-functional extension groups selected from 2,2,4-trimethylhexamethylene diisocyanate, isophorone diisocyanate, 1,6-hexane diisocyanate, methylene bis (4-cyclohexylisocyanate), and combinations thereof; and/or wherein the functional endcaps includes acetoacetate groups; and/or wherein the acetoacetate groups are derived from C1 to C6 acetoacetate.

In another approach or embodiment, this disclosure also describes a flexible block copolymer, suited in some approaches for use in an epoxy component of a two-part, epoxy-amine system, including the reaction product of (i) a hydrophobic polyol selected from a C20 to C60 dimer or trimer fatty acid, diesters of a digycidyl ether, diesters of a digycidyl ester, and combinations thereof; (ii) optional isocyanate-functional extension groups, and (iii) one or more C4 to C9 cyclic esters; the reaction product is functionally end capped with epoxy groups, acetoacetate groups, or both. In some approaches, the endcaps have a functionality greater than 1. In other approaches, the one or more C4 to C9 cyclic esters form a cyclic ester-derived block of the flexible block copolymer including at least 3 or more repeating cyclic ester-derived groups.

The flexible block copolymer as described in the previous paragraph may have additional embodiments when combined with one or more optional features in any combination. These optional features may include one or more of the following: wherein the hydrophobic polyol is the C20 to a C60 dimer or trimer fatty acid and wherein the cyclic ester-derived block includes the residue of at least 3 or more repeating caprolactone-derived groups; and/or wherein the hydrophobic polyol is derived from a diester of a digycidyl ether; and/or wherein the hydrophobic polyol block is derived from glycidyl ethers of (cyclo)aliphatic or aromatic hydroxy compounds including one or more of ethylene glycol, glycerol or cyclohexanediol; and/or wherein the hydrophobic polyol is derived from a diester of a digycidyl ester; and/or wherein the hydrophobic polyol block is derived from polyglycidyl esters of polycarboxylic acids; and/or further comprising isocyanate-functional extension groups selected from 2,2,4-trimethylhexamethylene diisocyanate, isophorone diisocyanate, 1,6-hexane diisocyanate, methylene bis (4-cyclohexylisocyanate), and combinations thereof; and/or, wherein the functional endcaps includes the acetoacetate groups derived from C1 to C6 acetoacetate.

In yet another approach or embodiment, a coating compositions is described herein, such as an epoxy/amine two-part coating composition, including any of the above described embodiments of flexible block copolymers from the preceding paragraphs.

In yet further approaches or embodiments, a use of the flexible block copolymers herein is described to provide a flexible polymer at temperatures down to about −60° C. and the use of such copolymers within the coating compositions as described herein to achieve such flexibility.

DETAILED DESCRIPTION

The present disclosure describes polymers and improved resin systems and methods of preparing the polymers and improved resin systems having one or more of flexibility, low water uptake, good adhesion, chemical resistance, and/or weatherability at extreme negative temperatures, such as temperatures down to about −40° C. or below and even temperatures down to about −60° C. The systems herein, in approaches, include a polymer or resin system for an epoxy component of an epoxy/amine system including an epoxy and/or acetoacetoxy functionalized flexible block copolymer that has a base hydrophobic polyol block or core, optional flexible monomeric blocks, and epoxy, acetoacetoxy, or both functional endcaps. This combination provides a flexible polymer having amine reactivity (via the epoxy or acetoacetate end groups), flexibility (via select polyol bocks and/or optional flexible monomeric blocks), and hydrophobicity (via the polyol choice). Coatings including this polymer within the epoxy component of a two-part system, not only pass a flexibility requirement at temperatures down to about −60° C. as described further herein or via ASTM D522-93A, but may also pass the other typical coatings requirements such as adhesion (ASTM D 3359-09e2), weatherability (ASTM D 4587), durability (ASTM D2240 for Shore D hardness) and/or low moisture or water uptake as further described herein.

In one approach, a flexible block copolymer is described herein that may be suitable for use in the epoxy component of a two-part, epoxy-amine system. The flexible block copolymer may include at least a hydrophobic polyol block and functional endcaps provided by epoxy groups, acetoacetate groups, or both. Preferably, the endcaps have a functionality greater than 1. In some approaches, the polymer may also include optional isocyanate-functional extension groups as needed for certain applications, such as to improve toughness or durability of the coatings. To provide flexibility, the block copolymer may either include select polyalkylene glycol diol blocks having a molecular weight to impart flexibility or, if the hydrophobic polyol block includes epoxy and/or fatty acid derived polyol groups, then the flexible copolymer may also include one or more lactone-derived flexibility blocks each having the residue of at least 3 or more repeating lactone groups.

In some cases, for instance, the hydrophobic polyol block may include a C20 to C60 or a C36 to a C54 dimer and/or trimer fatty acid polyol. In such approach, flexibility may be improved by also including the one or more lactone-derived blocks provided by the residue of at least 3 or more repeating lactone groups, such as caprolactone groups (in other approaches, 3 to 10 repeating lactone groups, 3 to 8 repeating lactone groups, 3 to 6, or 3 to 4 repeating groups). In other instances, the hydrophobic polyol block may be sufficiently flexible without further added flexibility blocks. In this approach, the hydrophobic polyol block may include a polyalkyleneglycol diol having a number average molecular weight of about 500 to about 2000 g/mol. Each of these components will be describe further below.

Coating Composition

In one aspect of this disclosure, a polymeric binder system is provided that is an epoxy functional or epoxy compatible resin or block polymer or copolymer with an internally flexible monomeric blocks and epoxy and/or acetoacetoxy end functionality suitable for the epoxy portion of an epoxy/amide system. In some approaches, the polymer may be an acetoacetoxy functional, polyester or epoxy block copolymer such as an acetoacetoxy functional dimer fatty acid/polyester block copolymer or an acetoacetoxy functional epoxy-polyester block copolymer and derivatives thereof. In some approaches, derivatives of such block copolymers may include, but not limited to, polypropylene glycol bases, polycarbonate diol base, and urethane modification.

The polymeric binder may have any suitable glass transition temperature (Tg). In some approaches or embodiments, the polymeric binder or block copolymer herein may have a Tg from about −80 to about 80° C., suitably from about −60 to about 40° C., or even from about −40 to about 20° C. However, the Tg may vary as needed for particular applications.

Hydrophobic Polyol Block or Core

The block copolymer herein may include as a first portion a hydrophobic polyol block or a hydrophobic polyol core providing, in one approach, a suitable base portion of the block copolymer. In some approaches or embodiments, this hydrophobic polyol block or core of the copolymer may be derived from a dimer or trimer fatty acid polyol, a polyalkylene glycol, or an epoxy resin.

Dimer or Trimer Fatty Acid: In some approaches, the hydrophobic polyol block or core may be a polyol derived from a dimer or trimer fatty acid or be a residue of a dimer or trimer fatty acid, which may also include blends of dimer and trimer fatty acids. In some approaches, the starting dimer acids or dimerized fatty acids used as the core block of the polymers herein are dimerized or trimerized C10 to C30 fatty acids. Such dimer or trimer acids may be prepared by heating the methyl esters of polyunsaturated acids, such as linoleic or linolenic acids for instance, at high temperatures. As used herein, the term residue contemplates a part of a reactant molecule which remains in the polymer reaction product compound after a reaction has occurred. The resultant dimer or trimer fatty acid core may be a C30 to C60 dimer or trimer fatty acid polyol, and in other approaches, a C36 to C54 dimer or trimer fatty acid polyol or residue thereof.

A dimer fatty acid or trimer fatty acid is the dimerization or trimerization products of mono- or poly-unsaturated fatty acids and/or esters. Due to the carboxylic acid group on each individual fatty acid (monomer), a dimer fatty acid comprises two carboxylic acid groups and a trimer fatty acid includes three carboxylic acid groups. Thus, a dimer fatty residue generally refers to a residue of a dimer fatty acid or a residue of a dimer fatty acid derivative such as a dimer fatty diol. Likewise, a trimer fatty residue is a residue of a trimer fatty acid or a residue of a trimer fatty acid derivative such as a trimer fatty triol.

In some approaches, the dimer fatty acids or dimer fatty residues may be derived from the dimerization products of C10 to C30 fatty acids, in other approaches, C12 to C24 fatty acids, in yet other approaches, C14 to C22 fatty acids, in further approaches, C16 to C20 fatty acids, and in certain applications C18 fatty acids. Thus, the resulting dimer fatty acids may include 20 to 60 carbon atoms, 24 to 48 carbons, 28 to 44 carbons, 32 to 40 carbons, and in some approaches, 36 carbon atoms. The fatty acids used to form the dimer fatty acids used herein may be from linear or branched unsaturated fatty acids. Suitable dimer fatty acids are derived from the dimerization of oleic acid, linoleic acid, linolenic acid, palmitoleic acid, or elaidic acid to suggest a few fatty acid sources. In some approaches, the molecular weight (weight average) of the dimer fatty acid (or residue thereof) may be about 450 to about 700, about 500 to about 650, about 525 to about 600, or about 550 to about 600 g/mol.

In other approaches, the hydrophobic polyol in the copolymers herein may also be derived from a trimer fatty acid or be the residue of a trimer fatty acid. In this instance, the trimer fatty acids may be derived from the trimerization products of the fatty acids noted above. In this approach, the trimer fatty acid may be trimers of fatty acids having 10 to 30 carbons, 12 to 24 carbons, 16 to 20 carbons, and in some instances, C18 fatty acids. Thus, the resultant trimer fatty acids may have 30 to 90 carbon atoms, 36 to 72 carbon atoms, 42 to 66 carbon atoms, or in some instances, 54 carbon atoms. The molecular weight (weight average) of the trimer fatty acids (or residue thereof) may about 750 to 1,000, about 800 to about 900, or about 825 to 875 g/mol.

The copolymers herein may include about 20 wt % to about 65 wt % of the dimer and/or trimer fatty acid residue as the hydrophobic polyol block or core, in other approaches, about 25 to about 50 wt %, and in yet other approaches, about 30 to about 45 wt % of the dimer or trimer fatty acid residue. In some approaches, the core may be formed from a blend of dimer and trimer fatty acids, which may include up to about 10 weight percent of the trimer acids, up to about 8 percent trimer acids, up to about 6 percent trimer acids, or up to about 4 percent of the trimer acids. In other approaches, the blend may include about 1 to about 10 percent trimer acids or any other range therewithin appropriate for the application. As discussed more below, when the copolymers herein include the dimer or trimer fatty acids as the hydrophobic block or core, the copolymers may also include the flexible monomer block, such as the polylactone or the like groups.

Polyalkylene Glycol: In some approaches, the hydrophobic polyol block or core may be derived from a polyalkylene glycol diol or be a residue of a polyalkylene glycol diol. In some approaches, the polyalkylene glycol diol may be a polymer derived from a C2 to C4 glycol and have a sufficient molecular weight to impart flexibility to the polymers herein. For example, the diols suitable for the hydrophobic polyol block or core may be derived from ethylene glycol, diethylene glycol, triethylene glycol, propylene glycol, dipropylene glycol, and the like, and combinations thereof. The resulting polyalkylene glycol diol may have the general Formula I:

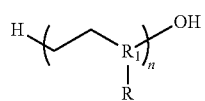
(Formula I)

wherein R may be hydrogen or a methyl group, $R_1$ is a C1 to C2 group, and n may be an integer sufficient for the diol (or residue thereof) to have a number average molecular weight from about 500 to about 2000 g/mol, in other approaches, about 800 to about 1800 g/mol, about 900 to about 1500 g/mol, or about 950 to about 1200 g/mol. In some approaches, suitable polyalkylene glycol diols, such as polypropylene glycols and polyethylene glycols may be obtained by the reaction of a diol with the corresponding alkylene oxide. Polyalkylene glycol diols of such molecular weight are sufficiently flexible in the context of the copolymers herein. Thus, in some approaches, when the copolymers include this hydrophobic polyol block or core, the copolymers herein do not necessarily use the additional flexible monomer blocks in the form of the polylactone blocks. In this instance, the copolymers in such instance are generally free of the polylactone blocks, but may include them as needed for particular applications.

If used in the copolymers herein, the polymer may include about 50 to about 95 wt %, and in yet other approaches, about 60 to about 88 wt %, and in yet further approaches, about 70 to about 80 wt % of the polyalkylene glycol diol or residue thereof.

Epoxy-derived Hydrophobic Polyol Block or Core: In some approaches, the copolymers herein may include an epoxy derived polyol or epoxy-polyol residues for the hydrophobic polyol block or core. For example, useful epoxies may include epoxy-functional bisphenol and cycloalphatic epoxies such as diesters of a diglycidyl ether or a diester of a digycidyl ester. Exemplary epoxies may include the di- or polyglycidyl ethers of (cyclo)aliphatic or aromatic hydroxy compounds, such as ethylene glycol, glycerol or cyclohexanediol, or cycloaliphatic epoxy compounds such as epoxidized styrene or divinylbenzene which may subsequently be hydrogenated; glycidyl esters of fatty acids, containing for example from 6 to 24 carbon atoms; glycidyl (meth)acrylate; epoxy compounds containing an isocyanurate group; an epoxidized polyalkadiene such as, for example, epoxidized polybutadiene; epoxy resins obtained by epoxidation of aliphatic and/or cycloaliphatic alkenes, such as, for example, dipentene dioxide, dicyclopentadiene dioxide and vinylcyclohexene dioxide, and resins containing glycidyl groups, for example polyesters or polyurethanes containing one or more glycidyl groups per molecule, or mixtures of the abovementioned epoxy resins.

Other suitable epoxide compounds may include polyglycidyl ethers based on polyhydric, preferably dihydric, alcohols, phenols, hydrogenation products of these phenols and the like components. Examples of polyhydric phenols are: resorcinol, hydroquinone, 2,2-bis(4-hydroxyphenyl)propane (bisphenol A), isomer mixtures of dihydroxydiphenylmethane (bisphenol-F), tetrabromobisphenol A, 4,4'-dihydroxy-diphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1-bis(4hydroxyphenyl)isobutane, 2,2-bis(4-hydroxy-tert-butylphenyl)propane, bis(2-hydroxynaphthyl)methane, 1,5 dihydroxynaphthalene, tris(4-hydroxyphenyl)methane, bis(4-hydroxyphenyl) ether, bis(4-hydroxyphenyl) sulfone etc. and the products of chlorination and bromination of the abovementioned compounds.

In some approaches, the polyol block or core may also be one or more polyglycidyl esters of polycarboxylic acids, which may be obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-napthalenedicarboxylic acid and dimerized linolenic acid. Examples are diglycidyl adipate, diglycidyl phthalate and diglycidyl hexahydrophthalate If used in the copolymers herein, the polymers may include about 12 weight % to about 30 weight % of the epoxy component in the epoxy-derived polyol, in other approaches, about 15 weight percent to about 25 weight %. As discussed more below, when the copolymers herein include the epoxy-derived hydrophobic polyols, the copolymers may also include the additional flexible monomer blocks, such as the polylactone groups.

Optional Extension Group

In some instances, the flexible copolymer herein may also include optional isocyanate functional extension groups if appropriate for certain application. For instance, isocyanate functional extension groups may help aid in durability and toughness of the coatings as evidenced by increased Shore D hardness. In some approaches, the extension groups may be derived from or include residues from di or poly-isocyanates and have an average of at least two isocyanate groups per molecule.

Representative di or poly-isocyanates extension groups, in some approaches, may include aliphatic isocyanates and/or diisocyanates such as ethylene, trimethylene, tetramethylene, pentamethylene, hexamethylene, 1,2-propylene, 1,2-butylene, 2,3-butylene, 1,3-butylene, and/or 1,6 hexane diisocyanates and the like compounds. In other approaches, the extension group may include substituted hexamethylene isocyanates such as 2,2,4-trimethyl hexamethylene diisocyanate and the like compounds. In yet further approaches, cycloalkylene isocyanate may be extension groups and include, for example, methylene bis(4-cyclohexylisocyanate), 3-isocyanatomethyl-3,5,5-trimethylcyclohexylisocyanate, bis(4-isocyanatocyclohexyl)methane, and the 1,3-cyclopentane, 1,3-cyclohexane, and 1,2-cyclohexane diisocyanates, and/or isophorone diisocyante and the like compounds. Aromatic isocyanate compounds may also be used for the extension group and may include m-phenylene, p-phenylene, 4,4-diphenyl, 1,5-naphthalene and 1,4-naphthalene diisocyanates. Aliphatic-aromatic compounds may also be used, such as 4,4-diphenylene methane, 2,4- or 2,6-toluene or mixtures thereof, 4,4'-toluidine, and 1,4-xylylene diisocyanates. Lastly, suitable extension groups may also include, in some instances, tri- and higher isocyanates such as triphenyl methane-4,4',4"-triisocyanate toluene, 4,4'-diphenyl-dimethyl methane-2,2',5,5'-tetraisocyanate, and the like compounds.

If included in the compositions herein, the copolymer may include about 2 to about 9 weight percent, and in other approaches, about 3 to about 7 weight percent, and in yet other approaches, about 4 to about 5 weight percent.

Polylactone Group or Block for Flexibility

In some approaches, the flexible copolymers herein may be aided by the inclusion of further flexibility blocks. In such instance, the copolymers herein may also include blocks derived from cyclic esters or include residues of cyclic esters such as lactones having 4 to 10 carbon atoms with cyclic esters of six carbon atoms (such as epsilon-caprolactone) being one suitable example. The additional polylactone groups or flexibility blocks are particularly suited for copolymers having the fatty acid or epoxy as the base hydrophobic group as discussed above. The flexible monomer blocks herein may be bonded to the hydrophobic polyol block or core (as optionally extended as discussed above) and may link the hydrophobic block or core to the functional end caps discussed below.

For instance, the copolymers herein may include flexibility blocks having the structure —(O(CH$_2$)$_x$CO)$_y$— wherein x may be an integer from 3 to 9 (in other approaches, 4 to 5, and in yet further approaches, 5) and y may be an integer of at least 3 and, in other approaches, 3 to 10 (or 3 to 8 or 3 to 6) in order to provide sufficient flexibility to the copolymer. If included in the copolymers herein, the amount of cyclic ester, such as epsilon-caprolactone, in the block copolymers may be about 12 weight percent to about 68 weight percent, in other approaches, about 20 weight percent, to about 62 weight percent, and in yet further approaches, about 35 to about 52 weight percent provided by at least three of more repeating units of the cyclic ester in each block. The flexibility bock or residue thereof may have a number average molecular weight of about 300 to about 1500 g/mol, or about 300 to about 950 g/mol.

In some approaches, the cyclic esters suitable as reactant starting materials to form the flexibility blocks of the present application may be those of Formula II

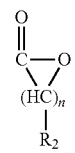

(Formula II)

wherein n is an integer from 3 to 9, and in some cases, 4 to 5 and each R$_2$, individually, is hydrogen, a C1 to C4 alkyl group, a C1 to C4 alkoxy group, and/or a halo groups. In some approaches, the flexibility providing cyclic esters may include unsubstituted lactones such as epsilon-caprolactone. In other approaches, the flexibility providing lactone may be monoalkyl-, dialkyl-, and trialkyl-lactones or epsilon-caprolactones such as the monomethyl-, dimethyl-, trimethyl-, monoethyl-, diethyl-, triethyl-, monopropyl-, dipropyl-, tripropyl-, monoisopropyl-, and mono-n-butyl-caprolactones, and the like lactones and caprolactones. In further approaches, the flexibility providing lactone may be monoalkoxy-, dialkoxy-, and trialkoxy-lactones or epsilon-caprolactones such as the monomethoxy-, dimethoxy-, trimethoxy-, monoethoxy-, diethoxy-, triethoxy, mono-n-propoxy-, and monoisobutyl-epsilon-lactones or caprolactone; chloro-epsilon-caprolactone; and the like.

Epoxy or Acetoacetate Functional Group

The flexible polymers herein may also be functionalized with a terminal epoxy and/or acetoacetate end group or endcap and have a reactive functionality (such as with amines) of greater than 1, such as 2 to 4 or 2 to 3. In some approaches, the functionalized polymers herein may be epoxy and/or acetoacetyl-functional polymers or copolymers and may include one or more of an epoxy end group and/or the following terminal acetoacetyl-functional groups end groups of Formula III:

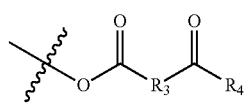

(Formula III)

wherein R$_3$ is preferably a C1, and R$_4$ is preferably a methyl group. The wavy line above indicates a covalent bond to the remainder of the block polymer as described above and, in some approaches, endcaps or terminal groups of the block copolymer. The acetoacetyl-functional group may be bonded to the cyclic ester functional block or directly to the polyol functional block as needed for a particular application.

In some approaches, the terminal acetoacetyl-functionality may be incorporated into the copolymer through the use of appropriate dicarbonyl moieties or dicarbonyl derivatives such as acetoacetoxyethyl acrylate, acetoacetoxypropyl methacrylate, allyl acetoacetate, acetoacetoxybutyl methacrylate, 2,3-di(acetoacetoxy)propyl methacrylate, 2-(acetoacetoxy) ethyl methacrylate, t-butyl acetoacetate, diketene, and the like, or combinations thereof. In general, any polymerizable hydroxy functional or other active hydrogen containing monomer can be converted to the corresponding dicarbonyl moiety such as the acetoacetyl-functional groups by reaction with diketene or other suitable acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). In some approaches, the acetoacetyl-functional endgroup or endcap is incorporated into the flexible polymer via 2-(acetoacetoxy) ethyl methacrylate, t-butyl acetoacetate, diketene, and the like compounds, or combinations thereof.

The amount of epoxy or acetoacetyl terminal functionality the copolymers herein may be suitable to achieve the functionality as discussed above wherein functionality refers to the ability of an epoxy or an acetoacetyl group to react with an amine provided in the amine portion of the two part composition.

Polymerization of the Flexible Polymer: The flexible polymer herein may be prepared as a reaction product of the hydrophobic polyol block or core or monomers, optional cyclic ester monomers or derived blocks, optional extension group monomers or derived blocks, and end capped with the epoxy or acetoacetate groups or monomers. Polymerization may occur, in one approach, by reacting the selected polyol component with the cyclic-ester to form a flexibilized polyol prepolymer, which may then be end-capped with the epoxy or acetoacetate to form the flexible resin or block copolymer herein having a polyol block (provide for instance by the fatty acid dimer or trimer or epoxy polyol), a flexibility block (provided by the cyclic ester units), and a terminal functional block (provided by the epoxy or acetoacetate end caps). In other approaches, if the selected polyol has sufficiently flexibility, such as with the polyalkylene glycol diol polyols having the molecular weights discussed herein, then the polyol may be directly reacted with the epoxy or acetoacetate end caps to provide functionality. In yet other approaches, the polyol may first be reacted with the optional extension groups to provide a larger polyol block or base, which is then reacted further as discussed above. Further details of the flexible block copolymer formation can also be found in the Examples herein. In some approaches, any embodiment of the block copolymers herein may have a number average molecular weight of about 2,000 g/mol or greater, and in some approaches, about 2,000 to about 5,000 g/mol, in other approaches, about 2,000 to about 4,000 g/mol or about 2,000 to about 3,000 g/mol. Any of the block copolymers herein may also have a polydispersity index of about 1.2 to about 4, in other approaches, about 1.2 to about 3, about 1.2 to about 2, or about 1.2 to about 1.5. Typical glass transition temperatures (Tg) of any of the polymers or copolymers herein may range from about 0 to about −40° C., in other approaches, about −20 to about −40° C., or about −20 to about −30° C.

Epoxy Component of the Two-Component Systems

The above described flexible resin or block copolymer may be used individually in a coating, but is suited for blending within an epoxy component of, for instance, an epoxy-amine two-component resin system. In this approach, the epoxy component of a two-component system may include the copolymer described above. In some approaches, the flexible block copolymers herein may be about 0.1 to about 100 weight percent of the epoxy component of a two-part system, in other approaches, about 1 to about 90 weight percent, and in yet other approaches, about 5 to about 80 weight percent of the epoxy component. In other approaches, the flexible block copolymers herein may be about 2.5 to about 75 weight percent of the total epoxy-amine two-part system, and in other approaches, about 5 to about 60 weight percent, and in yet other approaches, about 7.5 to about 50 weight percent of the total epoxy-amine system.

Curing Agent of the Two-Component Systems

The flexible epoxy resin component described above may, in some approaches, be combined with an amine-based curing agent to form the two-component epoxy/amine resin system. In such approaches, the curing agent may include one or more amine, amide, amino, amindo, imidazoline, and/or aminoamide polymers or copolymers. For example, the curing agent may include at least one or more polymers and/or copolymers derived from combinations of compounds including at least one polyamine, polyamide, polyamidoamine, aliphatic amine, phenalkamine, polyetheramine modified phenalkamine, dimer-diamine (mixtures of C36 dimeric diamine, C18 amine, C54 trimeric amine), cycloaliphatic polyamine, polyether polyamine, alkyletheramine, polyethylenimine, fatty alcohol adducted polyetheramine, polyetherurethanamine, polyether-urethanepolyamine, polyurethaneamine, polyetheramine, polyetheramide, polypropyleneamide, polypropyleneamine, polyamide made by reacting with dimer fatty acids, phenalkamide, polyamidoimidazoline, polyetherpolyamides or polyamino amide this is inclusive of adducts, modifications and derivatives thereof and optionally an amine multifunctional monomer suitable for curing the epoxy resin binder.

Appropriate polyamides may be produced by any suitable method. Such polyamides may include (homo)polymers or copolymers derived from combinations of polyamines and dicarboxylic acids. Examples of suitable polyamines include, but are not limited, one or more of hexamethylenediamine; ethylenediamine; diethylenetriamine; polyethylenimine: triethylene tetramine; tetraethylenepentamine; isophoronediamine, and the like, or mixtures thereof. Examples of suitable dicarboxylic acids (or anhydride or ester derivatives) include, but are not limited to, one or more of adipic acid; decanedioic acid, and the like, or mixtures thereof. Dicarboxylic acids can also be used in the form of cyclic anhydrides of dicarboxylic acids, examples include maleic anhydride; sulfonic anhydride; phthalic anhydride or mixtures thereof. Dicarboxylic acids can also be used in the form of the di-ester materials such as diethyl malonate; dimethyl malonate or mixtures thereof. Suitably, the dicarboxylic acids are in the form of dimerised fatty acids. Examples of suitable dimerised fatty acids include, but are not limited to one or more of the following: dimerised fatty acids; adipic acid; dimer of stearic acid; dimer of palmitic acid; dimer of lauric acid or combinations/mixtures thereof.

In certain embodiments or approaches, the polyamide in the two-component system may be a polyamidoimidazoline. Appropriate polyamidoimidazolines may be formed by any suitable method. For example, such polyamidoimidazolines may include (homo)polymers or copolymers derived from combinations of polyamines and dicarboxylic acids. Examples of suitable polyamines and dicarboxylic acids include those described above.

Polyetheramines comprise a polyether backbone based on suitable compounds comprising an epoxide functionality including but not limited to one or more of the following: propylene oxide (PO), ethylene oxide (EO) or a mixture thereof. Suitably, the polyether backbone is selected from polypropylene glycol and/or polyethylene glycol. The terminal hydroxyl groups of the polyether backbone are suitably aminated to form the corresponding polyetheramine.

The polyamine, polyamide, polyamidoamine, aliphatic amine, phenalkamine, polyetheramine modified phenalkamine, dimer-diamine (mixtures of C36 Dimeric diamine, C18 amine, C54 Trimeric amine), cycloaliphatic polyamine, polyetherpolyamine, alkyletheramine, polyethylenimine, fatty alcohol adducted polyetheramine, polyetherurethanamine, polyether-urethanepolyamine, polyurethaneamine, polyetheramine, polyetheramide, polypropyleneamide, polypropyleneamine, polyamide made by reacting with dimer fatty acids, phenalkamide, polyamidoimidazoline, polyetherpolyamides or polyaminoamide and derivatives thereof are commercially available materials.

The curing agent may have any suitable weight-average molecular weight (Mw) appropriate for the desired application. In certain embodiments or approaches, the amine of the curing agent may have an Mw from about 100 to about 5,000 Daltons (Da=g/mole), suitably from about 100 to about 2000 Da, or even from about 100 to about 1000 Da. The curing agent may also have any suitable number-average molecular weight (Mn). In certain embodiments or approaches, the amine of the curing agent may have a Mn from about 50 to about 3000 Da, suitably from about 80 to about 2000 Da, or even from about 90 to about 1000 Da. The polyamine of the curing agent may have any suitable glass transition temperature (Tg). In certain embodiments or approaches, the polyamine may have a Tg from about −50 to about 50° C., suitably from about −30 to about 30° C., or even from about −20 to about 20° C.

Flexible Polymer and Resin System

In accordance with this disclosure and in some approaches, a low temperature crack resistant coating with low water absorption can be achieved using the resin system comprising at least one (but preferable combinations of) epoxy functional resin component described above, and at least one (but preferably combination of) polyamine or polyamide curing agents also described above, but suitable systems may not be limited to such components. The coatings and compositions herein remain flexible at temperatures down to about −60° C.

In some approaches, the coating composition of this disclosure may be 100% solids but may also have additional solvent added to aid application as needed for a particular use or application. In some instances, the systems herein include a two-component, ambient cure system with one part containing the epoxy functional component (Part A) and the other component containing the polyamine or polyamide functional component (Part B). (Parts A and B may also be reversed and used just for naming convention.) Other coating composition ingredients can be added to either or both components. A catalyst can be included in the composition to aid the curing mechanism. The coating cures to a hard film typically over several hours but this can vary dependent on the choice of resins and catalyst type/level used. In some approaches or embodiments, the resin system compositions may include about 5 to about 60 weight percent of the amine functional curing agents (in other approaches, about 25 to about 50 weight percent), about 20 to about 55 weight percent of epoxy resin(s) (in other approaches, about 30 to about 45 weight percent), and about 1 to about 50 weight percent of acetoacetate groups or residues thereof (in other approaches, about 10 to about 35 weight percent).

Typical formulations for the low temperature, low water absorption coatings of this disclosure have the following weight percent ranges of curing agent and epoxy resins. For example, prior to application of the coating composition Part A and Part B are combined in a ratio of typically between 1:4 and 4:1 (by weight) Part A to Part B. The two-component systems herein, in other approaches, may include about 2.5 to about 75 weight percent of the epoxy component (which includes about 1 to about 70 percent of the flexible block copolymer described above). The amine component preferably constitutes about 2.5 to about 97.5 weight percent of the total formulation. The total resin components of the mixture of Part A and Part B may constitute from about 20 weight percent to about 80 weight percent of the total coating composition. In other approaches, the total resin components constitute from about 25 weight percent to 70 weight percent of the coating composition.

Two-component systems can be prepared and applied by a number of processes, such as via high speed dispersion on a mixer or using for example a plaster mixing paddle and then trowel apply. Often, the pot life will typically be around about 1 to about 2 hours depending on the temperature of the material and environmental conditions. In other approaches, a heated plural component airless spray unit. In some approaches, the part A and part B components are heated to a temperature typically between about 30 to about 70° C. and then mixed in the fluid line before spray application onto the substrate. This temperature can vary depending on mixing machines used and/or the film build of the coating required.

The coating can be also be applied by means of spraying technology, brush, roller, spatula or dipping process. As an alternative it is also possible to use a multi-component spraying system. If applied to a metal surface, the metal surface may be typically cleaned before the coating is applied, in order to remove processing residues and the like. In some cases primers are applied as well.

One or more catalysts (accelerators) may be used to speed up the curing mechanism if helpful for certain applications. In some approaches, the catalysts may be Tris-(dimethyl aminomethyl)phenol, 1,3-propanediamine, 1,3-bis[3-(dimethylamino)propyl]urea, N'-(3-(dimethylamino)propyl)-N,N-dimethyl, 1,4-diazabicyclooctane (DABCO), 2-(2-(2-dimethylaminoethoxy)-ethylmethylamino)-ethanol, 1,8-diazabicyclo[5.4.0]undec-7-en (DBU), amino-n-propyldiethanolamine, Triethanolamine, N,N-dimethyldipropylenetriamine, Tris-(dimethyl aminomethyl) phenol, organic or inorganic acids and sulphonates. Suphonates may be preferred for some applications. The catalyst content may be about 0.1 to about 5.0 weight percent of the coating composition, and more preferably about 0.2 to about 1 weight percent of the coating composition.

Without intending to be bound by any theory, it is speculated that using the flexible copolymers herein as part of the epoxy component with ductile and flexibility monomeric blocks allows the energy from the contracting coating when exposed to stress from temperature shifts and/or extreme cold temperatures to be absorbed within the system rather than the coating snapping in a brittle manner. Another mechanism of energy absorption is also demonstrated by a number of the resin systems herein withstanding more stress before breakage.

As used herein, functionalized, functionality, or functional group means a group or moiety of a larger molecule or polymer reactive with another group or atom. For instance, in the context of a dicarbonyl functionalized polymer or oligomer, a functionality of one means a single dicarbonyl moiety, a functionality of two means two dicarbonyl moieties, and so forth.

As used herein, without the need for, without substantial levels of, in the absence of, or substantially free of, or free-of generally means the polymers and/or the coating compositions herein have less than about 1 weight percent, in other approaches, less than about 0.5 weight percent, in other approaches, less than about 0.2 weight percent, and in yet other approaches, none of the particular component.

The polymers and resin systems herein may also include other additives appropriate for the desired use or application. Additives as used herein refer to a general category of components or other raw materials that may be added to the coatings herein to promote various properties. Examples include, but are not limited to, surfactants, defoamers, biocides, mildewcides, algaecides, thickeners, anti-settling agents, pH buffers, corrosion inhibitors, driers, and/or anti-skinning agents.

As discussed above, the block copolymers herein may be flexible at extreme cold temperatures and/or also exhibit low water uptake. Flexibility may be determined via ASTM D522-93A (Mandrel Bend Test) or via other suitable manual bend test (example described below) and water absorption may be determined from a relative water immersion testing (as described below).

Manual bend test: A flexibility screening can be conducted over a temperature range down to about −60° C. For this evaluation, a resin blends can be made by mixing epoxy and amines resins together and then pouring the mix into silicone molds forming 60×3×12 mm strips and left to cure at 23° C. 50% humidity for 14 days. After 14 days, all strips are placed in an environmental cabinet and pre-conditioned at 23° C. The temperature of the cabinet is then reduced by 10° C./day to the desired temperature, such as down to about −60° C. A first test for bending is carried out at −15° C. or −20° C. where each strip is bent slightly between both fore fingers and thumbs (using thermal gloves) to test for any bending/movement as follows: Pass: thick strip flexed or was rigid (i.e., would not bend) and did not crack into 2 or more pieces. Fail: thick strip cracked into 2 or more pieces. Assuming the first test passes, repeated tests are conducted at 5° C. or 10° C. intervals down to the desired endpoint, such as about −60° C. If the film snapped into 2 pieces at any stage, the test was recorded as a fail, while progression to −60° C. without failure was recorded as a pass.

Water Absorption: Many combinations of flexible epoxy resins and curing agent are known to be water sensitive, so all epoxy amine resins blends were tested for water adsorption. Generally speaking, the less water absorbed by a binder system, the more durable it is (stated differently, water resistant binder systems are preferred because they tend to be more long-lasting and durable). Resin blends can be made by mixing epoxy and amines resins together and then pouring the mix into cube shaped silicone molds forming 4.5 cm×2 cm×2 cm cubes and left for 24 hours to cure. The cured resin cubes are removed from the silicone mold and left to set for an additional 7 days at 23° C. 50% humidity. Each individual cube is initially weighted to 4 decimal places before being immersed in deionized water (W1), where left for 5 days. After immersion each cube was patted dry with an absorbent cloth and weighed again (W2). Then percentage water absorption may be calculated as follows: Percent Water Absorption=((W1−W2)/W1)×100.

EXAMPLES

The following examples demonstrate the preparation of copolymers and coating compositions such as those described herein above. The examples are intended to be representative of the polymers that can be made and are not intended to limit the scope of the present disclosure to the specific illustrative examples disclosed below. All percentages, ratios, and amounts in this disclosure are by weight unless otherwise specified. Unless otherwise specified, all measurements herein are made at 23±1° C. and 50% relative humidity.

Example 1

A flexible polymer was prepared as follows: to a 5 liter, four neck, round bottom flask equipped with an agitator, condenser, Barrett trap, nitrogen inlet, heating mantle, thermocouple and temperature controller, 949.8 grams of a C36 dimer Fatty Acid diol (Pripol 2030, Croda Corp), 1200 grams of ε-Caprolactone, and 7.4 grams of Tin (II) Octoate was charged and heated to 150° C. under a nitrogen blanket. The mixture was held at 150° C. for 4 hours. The percent non-volatile content was taken and the mixture was held at 150° C. until the non-volatile content became constant. The temperature was then reduced to 145° C. and 554.4 grams of t-butyl acetoacetate was added over 90 minutes. Approximately 259.7 grams of t-butyl alcohol was collected as a byproduct. When the t-butyl alcohol collection had stopped, the percent non-volatile content was taken and the mixture was held at 145° C. until the non-volatile content became constant.

Example 2

Another flexible polymer was prepared as follows: to a 5 liter, four neck, round bottom flask equipped with an agitator, condenser, Barrett trap, nitrogen inlet, heating mantle, thermocouple and temperature controller, 953.5 grams of a C36 dimer fatty acid diol (Pripol 2030, Croda Corp.) and 122.5 grams of 2,2,4-Trimethylhexamethylenediisocyanate was charged and heated to 70-80° C. under a nitrogen blanket. The mixture was held between 70-80° C. until no free isocyanate groups was detected via infrared spectral analysis. Then, 1204.7 grams of ε-caprolactone, and 7.4 grams of tin (II) octoate was charged and heated to 150° C. The mixture was held at 150° C. for 4 hours. The percent non-volatile content was taken and the mixture was held at 150° C. until the non-volatile content became constant. The temperature was then reduced to 145° C. and 373.0 grams of t-butyl acetoacetate was added over 90 minutes. Approximately 161.2 grams of t-butyl alcohol was collected as a byproduct. When the t-butyl alcohol collection had stopped, the percent non-volatile content was taken and the mixture was held at 145° C. until the non-volatile content became constant.

Example 3

A flexible polymer was prepared as follows: to a 5 liter, four neck, round bottom flask equipped with an agitator, condenser, Barrett trap, nitrogen inlet, heating mantle, thermocouple and temperature controller, 2504.5 grams of a polypropylene glycol diol (Arcol PPG 1000 polyol, Covestro AG) and 785 grams of t-Butyl Acetoacetate was charged and heated to 145° C. under a nitrogen blanket. Approximately 367.8 grams of t-butyl alcohol was collected as a byproduct. When the t-butyl alcohol collection had stopped, the percent non-volatile content was taken and the mixture was held at 145° C. until the non-volatile content became constant.

Example 4

A flexible polymer was prepared as follows: To a 3 liter flask, equipped with stirrer, thermocouple, condenser Barrett trap, nitrogen inlet, heating mantle, thermocouple and temperature controller, 525.9 grams of ε-Caprolactone monomer, 85.5 grams of Dimethylol Propionic Acid, and 0.19 grams of Stannous Octoate were charged. The mixture was heated to 140° C. and hold for 2 hours or when acid value reached 55 to 58 mg KOH/g solid. Then 253.9 grams of a bisphenol diglycidyl ether epoxy (Epon 828, Hexion Corporation) and 0.25 grams of N-methylimidazole were charged to the reactor. The reactor temperature was held 140° C. for 3 hours or until acid value reached <5 mg KOH/g solid. The reactor was cooled to 100° C. before adding 107.7 grams of t-butyl acetoacetate and 0.50 grams of dibutyltin oxide (Fastcat 4201). The temperature was gradually ramped to 140° C. to distill t-butyl alcohol off.

Example 5

A flexible polymer was prepared as follows: To a 3 liter flask, equipped with stirrer, thermocouple, condenser Barrett trap, nitrogen inlet, heating mantle, thermocouple and temperature controller, 1869.0 grams of ε-Caprolactone monomer, 289.2 grams of Dimethylol Propionic Acid, and 0.65 grams of Stannous Octoate were charged. The mixture was heated to 140° C. and held for 2 hours or when acid value reached 55 to 58 mg KOH/g solid. Then 476.9 grams of Epon 828 (Hexion Corporation) and 0.75 grams of N-methylimidazole were charged to the reactor. The reactor temperature was held at 140° C. for 3 hours or until acid value reached <5 mg KOH/g solid. The reactor was cooled to 100° C. before adding 364.2 grams of t-butyl acetoacetate and 1.50 grams of dibutyltin oxide (Fastcat 4201). The temperature was gradually ramped to 140° C. to distill t-butyl alcohol off.

Example 6

A flexible polymer was prepared as follows: To a 3 liter flask, equipped with stirrer, thermocouple, condenser Barrett trap, nitrogen inlet, heating mantle, thermocouple and temperature controller, 185.0 grams of Epon 828 (Hexion Corporation) and 836.3 grams of a polyester diol (Dicap 2020, GEO Specialty Chemicals) were charged to the reactor, and were heated to 140° C. for 3 hours. The reactor was cooled to 100° C. before adding 70.7 grams of t-butyl acetoacetate and 0.55 grams of dibutyltin oxide. The temperature was gradually ramped to 140° C. to distill t-butyl alcohol off.

Example 7

A comparative two-component formulation was prepared as follows: Component A included 471 grams of Polymide Resin (100 Equ. Wt.) and 200 grams of Polytetramethylene ether glycol based polyether amine resin (660 Equ. Wt.). Component B included 838 grams of Bisphenol A based Epoxy resin (193 Equ. Wt.) and 0 grams of the flexible resin from Example 1. Each component was thoroughly mixed then combined and applied via a 125 micron drawdown bar to an abraded 0.8×102×152 mm R-46 dull matte finish steel panels (Q-Lab Corporation) and allowed to cure for 7 days at ambient temperature (23° C., 50% humidity).

Example 8

A comparative two-component formulation was prepared as follows: Component A included 378 grams of Polyamide Resin (100 Equ. Wt.) and 351 grams of Polytetramethylene ether glycol based polyether amine resin (660 Equ. Wt.). Component B included 780 grams of Bisphenol A based Epoxy resin (193 equ. Wt.) and 0 grams of Flexible resin from Example 1. Each component was thoroughly mixed then combined and applied via a 125 micron drawdown bar to an abraded 0.8×102×152 mm R-46 dull matte finish steel panels (Q-Lab Corporation) and allowed to cure for 7 days at ambient temperature (23° C., 50% humidity).

Example 9

An inventive two-component formulation was prepared as follows: Component A included 378 grams of Polyamide Resin (100 Equ. Wt.) and 200 grams of Polytetramethylene ether glycol based polyether amine resin (660 Equ. Wt.). Component B included 606 grams of Bisphenol A based Epoxy resin (193 equ. Wt.) and 325 grams of the Flexible resin from Example 1. Each component was thoroughly mixed then combined and applied via a 125 micron drawdown bar to an abraded 0.8×102×152 mm R-46 dull matte finish steel panels (Q-Lab Corporation) and allowed to cure for 7 days at ambient temperature (23° C., 50% humidity).

Example 10

An inventive two-component formulations was prepared as follows: Component A included 405 grams of Polyamide Resin (100 Equ. Wt.) and 100 grams of Polytetramethylene ether glycol based polyether amine resin (660 Equ. Wt.). Component B included 560 grams of Bisphenol A based Epoxy resin (193 equ. Wt.) and 444 grams of the Flexible resin from Example 1. Each component was thoroughly mixed then combined and applied via a 125 micron drawdown bar to an abraded 0.8×102×152 mm R-46 dull matte finish steel panels (Q-Lab Corporation) and allowed to cure for 7 days at ambient temperature (23° C., 50% humidity).

Example 11

An inventive two-component formulation was prepared as follows: Component A included 411 grams of Polyamide Resin (100 Equ. Wt.) and 77 grams of Polytetramethylene ether glycol based polyether amine resin (660 Equ. Wt.). Component B included 547 grams of Bisphenol A based Epoxy resin (193 equ. Wt.) and 474 grams of the Flexible resin from Example 1. Each component was thoroughly mixed then combined and applied via a 125 micron drawdown bar to an abraded 0.8×102×152 mm R-46 dull matte finish steel panels (Q-Lab Corporation) and allowed to cure for 7 days at ambient temperature (23° C., 50% humidity).

Example 12

The films from Examples 7 to 11 were evaluated for hardness (ASTM D2240), mandrel bend (ASTM D522-939, Test Method A, conical mandrel), and water absorption (as those tests are described herein) as set forth in Tables 1, 2, and 3 below. After 7 days of the noted cure the coated panels of Examples 7 to 11 and conical mandrel were placed in a climate controlled cabinet, where the temperature was reduced to −60° C. Then, the coated panels were evaluated for low temperature flexibility. The testing was repeated the next day at −55° C. and repeated each day down to the final temperature. Panels were evaluated for any cracks and delamination as set forth in Table 2.

TABLE 1

Shore D Hardness After 48 Hour Cure

| | Example 7 | Example 8 | Example 9 | Example 10 | Example 11 |
|---|---|---|---|---|---|
| Shore D Value | 80 | 42.5 | 15 | 12.5 | 12.5 |

TABLE 2

30-10 mm Conical Mandrel Bend Test at Reduced Temperatures After 7 Day Cure

| Temperature | Example 7 | Example 8 | Example 9 | Example 10 | Example 11 |
|---|---|---|---|---|---|
| −20° C. | Fail | Pass | Pass | Pass | Pass |
| −30° C. | Fail | Pass | Pass | Pass | Pass |
| −40° C. | Fail | Pass | Pass | Pass | Pass |
| −50° C. | Fail | Fail | Pass | Pass | Pass |
| −55° C. | Fail | Fail | Pass | Pass | Pass |
| −60° C. | Fail | Fail | Pass | Pass | Pass |

TABLE 3

Percent Water Absorption - 5 Day Cure/7 Day Immersion on Cubes

| | Example 7 | Example 8 | Example 9 | Example 10 | Example 11 |
|---|---|---|---|---|---|
| % Water Adsorption | 0.36 | 0.56 | 0.49 | 0.56 | 0.40 |

The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

Illustrative embodiments have been described, hereinabove. It will be apparent to those skilled in the art that the above devices and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein. It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A flexible block copolymer for use in an epoxy component of a two-part, epoxy-amine system, the flexible block copolymer comprising:
   a hydrophobic polyol block;
   functional endcaps provided by acetoacetate groups, the endcaps having a functionality greater than 1;
   optional isocyanate-functional extension groups;
   one or more cyclic ester-derived blocks between the hydrophobic polyol block and the functional endcaps, wherein each cyclic ester-derived block includes the residue of at least 3 or more repeating cyclic ester groups and wherein each cyclic ester-derived block has a number average molecular weight of about 300 to about 1500 g/mol; and wherein the hydrophobic polyol block includes a C20 to a C60 dimer and trimer fatty acid diol having 1 to 10 weight percent of the trimer fatty acid.

2. The flexible polymer according to claim 1, wherein the one or more cyclic ester-derived blocks includes the residue of at least 3 or more repeating lactone groups.

3. The flexible polymer according to claim 1, further comprising the isocyanate-functional extension groups selected from 2,2,4-trimethylhexamethylene diisocyanate, isophorone diisocyanate, 1,6-hexane diisocyanate, methylene bis (4-cyclohexylisocyanate), and combinations thereof.

4. The flexible polymer according to claim 1, wherein the acetoacetate groups are derived from C1 to C6 acetoacetate.

5. The flexible block copolymer according to claim 1, wherein the flexible block copolymer includes about 35 to about 52 weight percent of the one or more cyclic ester derived blocks and about 30 to about 45 weight percent of the hydrophobic polyol block.

6. A flexible block copolymer for use in an epoxy component of a two-part, epoxy-amine system, the flexible block copolymer comprising the reaction product of (i) a hydrophobic polyol including a C20 to C60 dimer and trimer fatty acid having 1 to 10 weight percent of the trimer fatty acid; (ii) optional isocyanate-functional extension groups, and (iii) one or more C4 to C9 cyclic esters; the reaction product is functionally end capped with acetoacetate groups, the endcaps having a functionality greater than 1; and wherein the one or more C4 to C9 cyclic esters form a cyclic ester-derived block of the flexible block copolymer including at least 3 or more repeating cyclic ester-derived groups and wherein each cyclic ester-derived block has a number average molecular weight of about 300 to about 1500 g/mol.

7. The flexible block copolymer according to claim 6, wherein the cyclic ester-derived block includes the residue of at least 3 or more repeating caprolactone-derived groups.

8. The flexible block copolymer according to claim 6, further comprising the isocyanate-functional extension groups selected from 2,2,4-trimethylhexamethylene diisocyanate, isophorone diisocyanate, 1,6-hexane diisocyanate, methylene bis (4-cyclohexylisocyanate), and combinations thereof.

9. The flexible block copolymer according to claim 6, wherein the functional endcaps includes the acetoacetate groups derived from C1 to C6 acetoacetate.

10. A coating composition including the flexible block copolymer of claim 6.

* * * * *